(12) United States Patent
Carmona et al.

(10) Patent No.: US 9,163,417 B2
(45) Date of Patent: Oct. 20, 2015

(54) METHOD OF ASSISTING THE PLACEMENT OF CONSTRUCTION ELEMENTS OF A CIVIL ENGINEERING WORK

(75) Inventors: Mikaël Carmona, Tencin (FR); Patrick Schermesser, Meylan (FR)

(73) Assignee: COMMISSARIAT À L'ÉNERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 824 days.

(21) Appl. No.: 13/397,274

(22) Filed: Feb. 15, 2012

(65) Prior Publication Data

US 2012/0221292 A1    Aug. 30, 2012

(30) Foreign Application Priority Data

Feb. 25, 2011   (FR) ..................................... 11 51575

(51) Int. Cl.
*G01C 1/00* (2006.01)
*E04G 21/22* (2006.01)
*G01C 9/06* (2006.01)

(52) U.S. Cl.
CPC *E04G 21/22* (2013.01); *G01C 9/06* (2013.01); *Y10T 29/49616* (2015.01)

(58) Field of Classification Search
CPC .. G05B 15/02; G05B 19/042; G05B 19/4093; G05B 19/41855; G05B 19/41865; G05B 19/41875; G05B 2219/31457; G05B 2219/32122; G05B 2219/32194; G05B 2219/32196; G05B 2219/32201; G05B 2219/32404; G05B 2219/33209; G05B 2219/35095
See application file for complete search history.

(56) References Cited

U.S. PATENT DOCUMENTS

| | | | | |
|---|---|---|---|---|
| 4,793,193 A | * | 12/1988 | Borgudd | .................. 73/862.043 |
| 8,024,980 B2 | * | 9/2011 | Arms et al. | ..................... 73/763 |
| 8,138,938 B2 | * | 3/2012 | Troy et al. | .................. 340/686.6 |
| 8,453,340 B2 | * | 6/2013 | van der Merwe et al. | ...... 33/512 |

FOREIGN PATENT DOCUMENTS

| | | |
|---|---|---|
| CH | 673 498 | 3/1990 |
| DE | CH 673498 A5 | 3/1990 |

(Continued)

OTHER PUBLICATIONS

M.Ilyas and I.Mahgoub, "Handbook of sensor networks, Compact sensing systems", CRC Press, 2005.
O.J. Woodman, "An introduction to inertial navigation", University of Cambridge, Computer laboratory, 696, 2007.
Tipler, J.F., et al. "Shake table testing of scaled geogrid-reinforced adobe wall models" *Department of Civil Engineering, University of Aukland*, Aukland. NZSEE Conference. 2010.

(Continued)

*Primary Examiner* — Elias Desta
(74) *Attorney, Agent, or Firm* — Occhiuti & Rohlicek LLP

(57) ABSTRACT

This method of assisting the placement of construction elements of a civil engineering work, comprises:
  the adjustment (108) of the orientation of each construction element as a function of a discrepancy between a measured orientation for this construction element and an orientation setpoint,
  the supplying of the construction elements each equipped with at least one orientation sensor, fixed without any degree of freedom to the construction element, able to measure the inclination of this construction element with respect to three non-coplanar axes, and
  in which the adjustment (108) of the orientation of each element is carried out as a function of the discrepancy between the orientation measured by the orientation sensor fixed to this construction element and the orientation setpoint.

12 Claims, 2 Drawing Sheets

(56) References Cited

FOREIGN PATENT DOCUMENTS

| | | |
|---|---|---|
| DE | 4409150 A1 | 9/1995 |
| DE | 19520795 A1 | 12/1996 |
| FR | 2842593 | 1/2004 |
| FR | 2946134 | 12/2010 |
| WO | 2009/118355 A1 | 10/2009 |

OTHER PUBLICATIONS

J. M. Engel, L. Zhao, Z. Fan, J. Chen, and C. Liu. Smart brick—a low cost, modular wireless sensor for civil structure monitoring. *International Conference on Computing, Communications and Control Technologies* (*CCCT* 2004), Austin, TX USA, Aug. 14-17, 2004.

* cited by examiner

METHOD OF ASSISTING THE PLACEMENT OF CONSTRUCTION ELEMENTS OF A CIVIL ENGINEERING WORK

RELATED APPLICATIONS

Under 35 USC 119, this application claims the benefit of the priority date of French Patent Application FR1151575, filed on the 25 Feb. 2011, the contents of which are herein incorporated by reference.

The invention relates to a method and a system for assisting the placement of construction elements of a civil engineering work. Its subject is also a construction element for this assistance system.

It is known to construct a civil engineering work by placing construction elements and joining them together.

The expression "civil engineering work" designates all constructions which are the labour of human beings, such as walls, bridges, roads, pipelines.

The expression "construction element" here designates any element which, after joining together, constitutes the civil engineering work. Generally the construction elements are structurally identical to one another. Thus, in the work, they differ from one another only through their respective orientation and position.

The construction of a work makes it necessary to orient each construction element correctly with respect to one another.

To do this, the applicant knows of methods of assisting the placement of construction elements of a civil engineering work. For example, known methods such as these comprise the adjustment of the orientation of each construction element as a function of a discrepancy between a measured orientation for this construction element and an orientation setpoint. The orientation of an element is also known by the term "attitude".

Typically the orientation is measured by placing a level on an exterior face of the construction element. Thereafter, the user adjusts the orientation of the construction element as a function of the measurement read off by virtue of the level until the desired orientation is obtained.

These measurement and adjustment operations must be carried out with particular care so as to guarantee the conformity of the work with predefined plans.

Placement of the construction elements therefore takes time and slows down the construction of the work. Placement of the elements is also subject to human errors.

Prior art is also known from the application CH673498A5.

The invention is aimed at remedying this drawback by proposing a method of assisting the placement of construction elements of a civil engineering work comprising:
  the supplying of the construction elements each equipped with at least one orientation sensor, fixed without any degree of freedom to the construction element, able to measure the inclination of this construction element with respect to three non-coplanar axes, and
  the adjustment of the orientation of each element is carried out as a function of the discrepancy between the orientation measured by the orientation sensor fixed to this construction element and the orientation setpoint.

The method hereinabove simplifies the construction of civil engineering work since it is no longer necessary, on the worksite, to position the level or another orientation sensor on the construction element in order to ascertain the discrepancy between the measured orientation and an orientation setpoint.

In the method hereinabove, it is the element itself which fulfils the level function. This makes it easier and therefore faster to lay these construction elements.

The embodiments of this method can comprise the following characteristics:
  the method comprises:
    the identification of the construction element to be placed,
    the selection of an orientation setpoint as a function of the construction element identified in a table containing several orientation setpoints, and
    the indication of the discrepancy between the measured orientation for the identified construction element and the selected setpoint;
  the adjustment of the position is carried out automatically by a robot for handling the construction element as a function of the said discrepancy.

These embodiments of the method furthermore exhibit the following advantage:
  varying the orientation setpoint and/or position setpoint as a function of the construction element to be placed makes it possible to limit the measurements carried out manually to construct a work in accordance with a plan.

The subject of the invention is also a system for assisting the placement of construction elements comprising:
  the construction elements to be positioned with respect to one another so as to construct the work, and
  at least one orientation sensor able to measure the inclination of this construction element with respect to three non-coplanar axes,
in which:
  each construction element is equipped with at least one orientation sensor, fixed without any degree of freedom to the construction element, able to measure the inclination of this construction element with respect to three non-coplanar axes, and
  the system comprises an electronic signalling device able to indicate the discrepancy between the orientation measured by the orientation sensor of any one of the construction elements and an orientation setpoint for this construction element.

The embodiments of this system can comprise one or more of the following characteristics:
  the signalling device is mechanically independent of the construction elements and comprises:
    a man-machine interface, and
    at least one electronic calculator programmed to control the man-machine interface so as to indicate in a way that is directly comprehensible to a human being the discrepancy between the orientation measured by the orientation sensor fixed to the construction element and the orientation setpoint for this construction element;
  the system also comprises a position sensor able to measure the coordinates of the construction element along three non-coplanar axes in a frame of reference tied to the earth, and the signalling device is able to also indicate a discrepancy between the position measured by the position sensor for any one of the construction elements and a position setpoint for this construction element.

These embodiments of the assistance system furthermore exhibit the following advantages:
  the use of a position sensor facilitates the positioning of the construction element in a frame of reference tied to the earth.

The subject of the invention is also a construction element for the system hereinabove.

The embodiments of this construction element can comprise one or more of the following characteristics:

the orientation sensor comprises:
- a three-axis accelerometer capable of measuring the intensity of the gravity field along three non-coplanar measurement axes, and
- a three-axis magnetometer capable of measuring the intensity of the terrestrial magnetic field along at least three non-coplanar measurement axes;

the orientation sensor also comprises a gyrometer, fixed without any degree of freedom to the construction element, capable of measuring the angular rotation speed of the construction element about three non-coplanar measurement axes;

the construction element also comprises a position sensor able to measure coordinates of the construction element along three non-coplanar axes in a frame of reference tied to the earth;

the orientation sensor is buried inside the construction element in such a way that no constituent element of the sensor is flush with an external face of the construction element or projects from an external face of the construction element;

the construction element is chosen from the group composed of a brick, a quarry-stone, a tube, a beam and a plate.

These embodiments of the construction element furthermore exhibit the following advantages:
- the use of a three-axis magnetometer in combination with a three-axis accelerometer makes it possible to compensate for the disturbances caused by magnetic objects in proximity to the construction element;
- the use of a gyrometer makes it possible to obtain a reliable measurement of the orientation even when the construction element is currently being moved,
- the incorporation of a position sensor inside the construction element makes it possible in addition to help to correctly position this construction element;
- the burial of the orientation sensor inside the construction element makes it possible to protect this sensor.

The invention will be better understood on reading the description which follows, given solely by way of nonlimiting example while referring to the drawings in which:

FIG. 1 represents a system 2 for assisting the placement of construction elements of a civil engineering work. To simplify FIG. 1, the civil engineering work undergoing construction is a simple wall 4.

Figure 1:
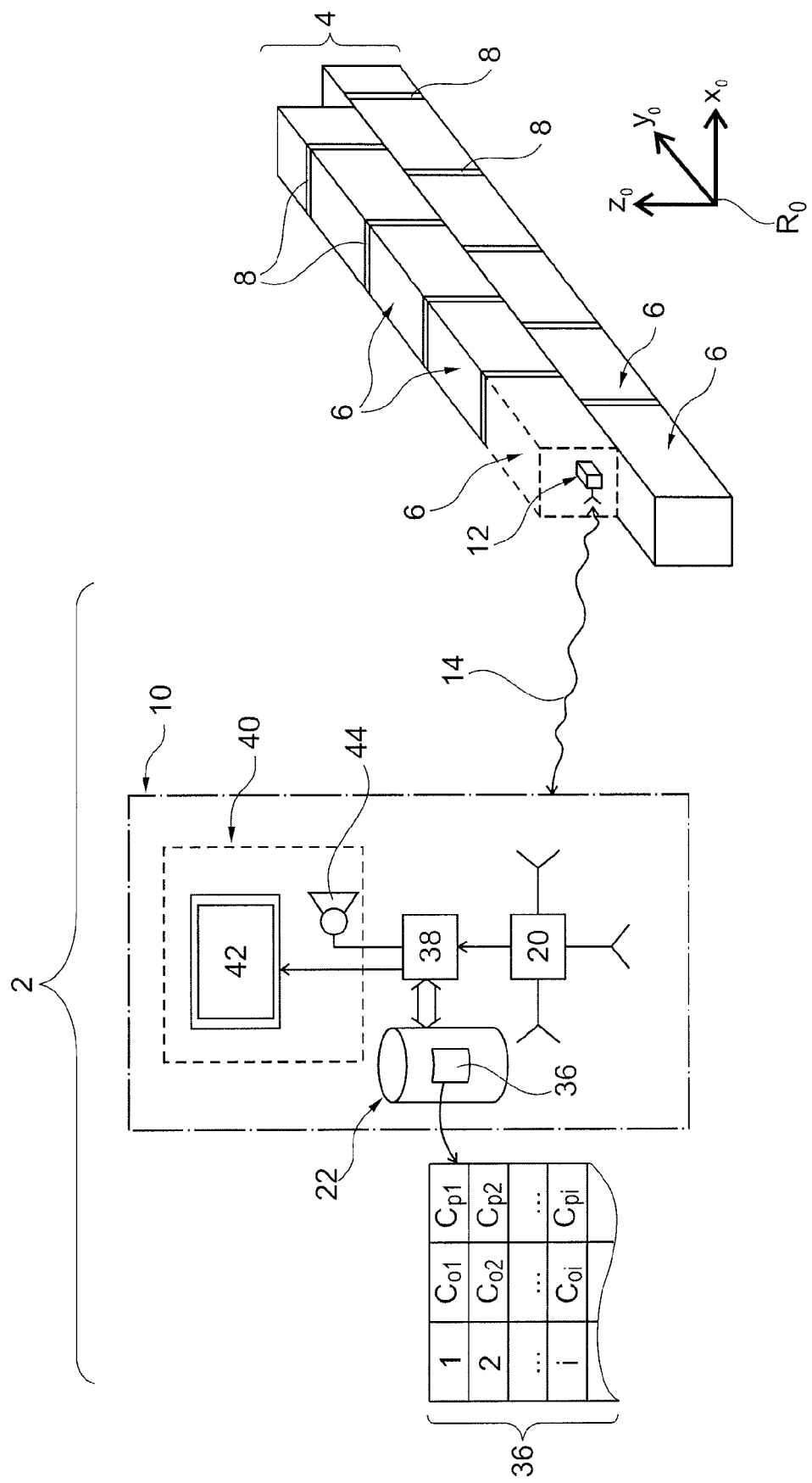
FIG. 1 is a schematic illustration of the architecture of a system for assisting the placement of construction elements of a civil engineering work.

The work 4 is formed by the stacking of construction elements 6 one above the other. In this embodiment, the construction elements 6 are structurally identical to one another. For example, the elements 6 are bricks of like dimension.

In the work 4, the elements 6 are secured together with the aid of a binder 8 such as cement.

The system 2 comprises the elements 6 and a signalling device 10.

Each element 6 comprises an instrumented module 12 able to measure, in particular, the orientation of this element in a frame of reference $R_0$ tied to the earth. This frame of reference $R_0$ comprises three axes $X_0$, $Y_0$ and $Z_0$ that are not coplanar and not mutually collinear. Here the axes $X_0$, $Y_0$ and $Z_0$ are mutually orthogonal. The axis $Z_0$ is vertical and therefore parallel to the gravity field.

The instrumented module 12 is also capable of transmitting, by way of a wireless link 14, the various physical quantities measured to the signalling device 10.

The link 14 is typically effected by amplitude-modulating or frequency-modulating an electromagnetic wave.

The device 10 comprises a position sensor 20 able to measure the coordinates $x_0$, $y_0$ and $z_0$ of each element 6 in the frame of reference $R_0$. Preferably, the sensor 20 determines the coordinates $x_0$, $y_0$ and $z_0$ on the basis of the electromagnetic waves emitted by the instrumented module 12. Such position sensors capable of locating an object on the basis of electromagnetic waves emitted by this object are known. For example, information about such sensors may be obtained from the following document:

M. ILYAS, I. MAHGOUB, "Handbook of sensor networks, Compact sensing systems", CRC PRESS, 2005.

For example, the sensor 20 is equipped with several antennas for determining the position of the element 6 by trilateration and/or by triangulation. Accordingly, the arrival times of the electromagnetic wave and/or the angles of arrival of this electromagnetic wave may be used.

Here, in addition to fulfilling the function of position sensor, the sensor 20 also fulfils the function of receiver of the measurements carried out by the instrumented module 12 and transmitted to the device 10 by way of the link 14.

The device 10 is equipped with a memory 22 containing a table 36. In FIG. 1, this table 36 is represented in greater detail just alongside the memory 22. For example, the table 36 associates an orientation setpoint $C_{oi}$ and a position setpoint $C_{pi}$ with an identifier i of a construction element. Here, the identifier i is simply a serial number indicating the order in which the various elements 6 must be placed. Thus, the table 36 associates the setpoints $C_{o1}$ and $C_{p1}$ with the first element 6 placed. Thereafter, it associates the setpoints $C_{o2}$ and $C_{p2}$ with the second element 6 placed to construct the work 4. Henceforth, this table 36 defines the order in which the elements 6 must be placed, as well as the orientation and the position of each of these elements 6. Typically, the table 36 is constructed on the basis of the plan of the work to be constructed. The symbol " . . . " in table 36 of FIG. 1 indicates only that not all the rows of this table have been represented.

A programmable electronic calculator 38 is connected to the memory 22 and to the sensor 20. This calculator is able to execute instructions recorded on an information recording medium. For this purpose, the memory 22 comprises the instructions necessary to execute the method of FIG. 3.

This calculator 38 is also connected to a man-machine interface 40. For example, here this interface 40 incorporates a screen 42 and a microphone 44 which are controlled by the calculator 38.

Figure 2:
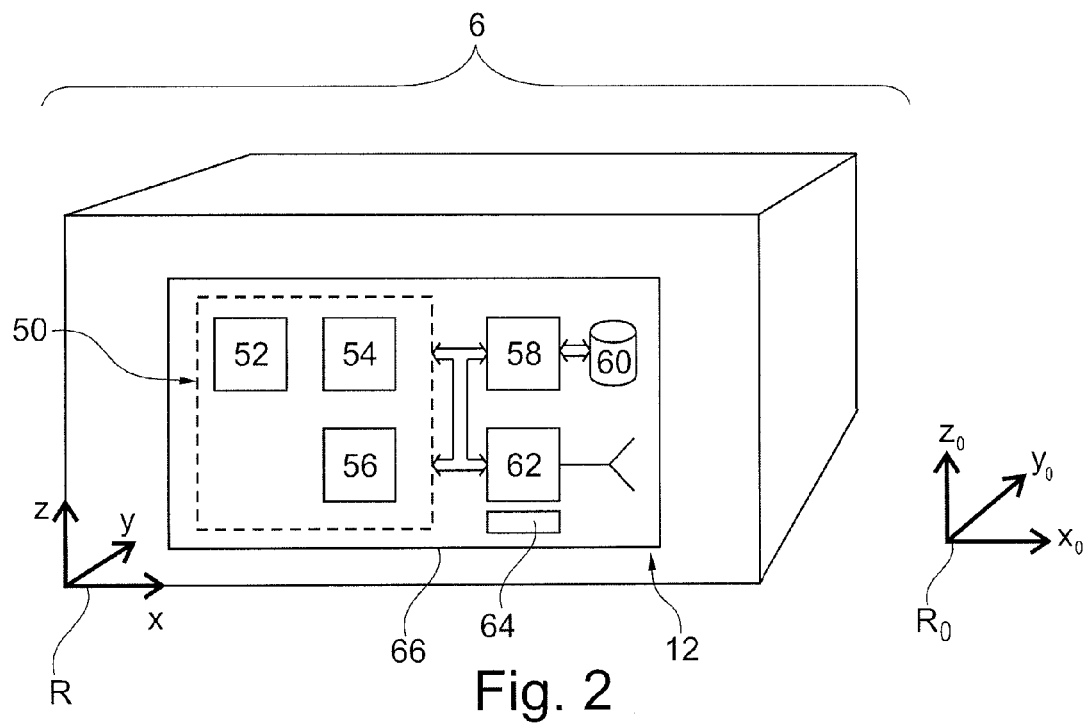
FIG. 2 is a schematic illustration of a construction element.

FIG. 2 represents a construction element 6 in greater detail.

The elements 6 are constituent elements of the work. They are all identical and only one of them is described in detail.

Here, the element 6 is very hard so as to support sizable weights, for example, greater than a tonne. For example, the element 6 is made of a material or a mixture of materials whose Young's modulus is greater than 10 or 20 GPa.

The element 6 is devised so as to be joined easily with the other elements 6. For example, each element 6 exhibits at least one plane bearing face on which another construction element may be disposed. In the case of the element 6 represented, the latter is a rectangular parallelepiped.

The instrumented module 12 is buried inside the material or materials constituting the element 6. Thus, none of the constituent elements of this module 12 is flush with any of the faces of the element 6 or projects with respect to the faces of the element 6.

The module 12 comprises in particular an orientation sensor 50 able to measure the inclination of the element 6 with respect to the axes $X_0$, $Y_0$ and $Z_0$ of the three-dimensional frame of reference $R_0$.

The sensor 50 is for example an inertial or attitude platform.

Attitude platforms and their operation are for example described in the following documents:

J. B. KUIPERS, "Quaternions and rotation sequences: a primer with applications to orbits, aerospace and virtual reality", Paper, 2002, O. J. WOODMAN, "An introduction to inertial navigation", University of Cambridge, Computer laboratory, 696, 2007.

Such an orientation sensor comprises a three-axis accelerometer 52, a three-axis magnetometer 54 and a three-axis gyrometer 56.

The accelerometer 52 is capable of measuring the direction of the gravity field in a frame of reference R. The frame of reference R is secured to the element 6. It comprises three axes X, Y and Z that are not coplanar and not mutually collinear. Here, the axes X, Y and Z are mutually orthogonal. For example, it is assumed that the axes X and Y are parallel to a lower face of the element 6 while the axes X and Z are parallel to a lateral face of this element 6. The accelerometer 52 measures the coordinates of the acceleration vector $a_r$ in the frame of reference R. In a static or quasi-static situation, this vector $a_r$ is connected with the coordinates of a vector $a_0$ of the gravity field measured in the frame of reference $R_0$ by the following relation:

$$a_r = P a_0, \quad (1)$$

where P is a matrix which gives the orientation of the element 6 in the frame of reference $R_0$.

The expression "static or quasi-static" designates the fact that the intensity of the acceleration caused by a movement of the element 6 is negligible compared with the intensity of the gravity field. For example, it is considered that the intensity of the acceleration is negligible if it is at least three, ten or thirty times less than the intensity of the gravity field.

The matrix P comprises five unknowns which must be determined to determine the orientation of the element 6.

For example, the three-axis accelerometer is an accelerometer sold by the company ANALOG DEVICE® under the reference ADXL327BCPZ.

The magnetometer 54 measures the coordinates $h_r$ of the terrestrial magnetic field in the frame of reference R. The coordinates $h_r$ in the frame of reference R are related with the coordinates $h_0$ of this terrestrial magnetic field in the frame of reference $R_0$ by the following relation:

$$h_r = P h_0, \quad (2)$$

where:
$h_r$ are the coordinates of the terrestrial magnetic field measured in the frame of reference R,
$h_0$ are the coordinates of the terrestrial magnetic field measured in the frame of reference $R_0$, and
P is the same matrix as that of relation (1).

The coordinates $a_0$ and $h_0$ of the gravity field and of the terrestrial magnetic field in the frame of reference $R_0$ are predetermined constants.

Relations (1) and (2) form a system with six equations with five unknowns. This therefore makes it possible to determine the orientation of the element 6 in the frame of reference $R_0$ under the assumption that the element 6 is static or quasi-static.

Having six equations for only five unknowns makes it possible to increase the robustness of the orientation to be measured, in particular, faced with magnetic disturbances caused by external magnetic objects mechanically independent of the element 6.

The gyrometer 56 measures the angular rotation speed of the element 6 about the three axes X, Y and Z. The use of the gyrometer makes it possible to measure the orientation of the element 6 even if the latter is not static or quasi-static. Thus, by virtue of this gyrometer, it becomes possible to measure the orientation of the element 6 in the course of its movement at a non-constant speed.

The sensor 50 is connected to a programmable embedded calculator 58. This calculator executes instructions recorded in a memory 60 of the module 12. The memory 60 comprises the instructions necessary for the execution of the method of FIG. 3.

The module 12 also comprises:
an emitter 62,
a battery 64 for powering the various electronic components of the module 12, and
a rigid shell 66 for protecting the various components of the instrumented module 12.

The emitter 62 is connected to the calculator 58. This emitter 62 establishes and transmits information by way of the link 14.

For example, the shell 66 is made of a material exhibiting a strictly greater Young's modulus than that of the material used to make the construction element 6. Here, the Young's modulus of the shell 66 is greater than 50 GPa or 70 GPa. The set of previously described electronic components of the module 12 are housed inside this shell 66 so as to be protected therein.

Figure 3:
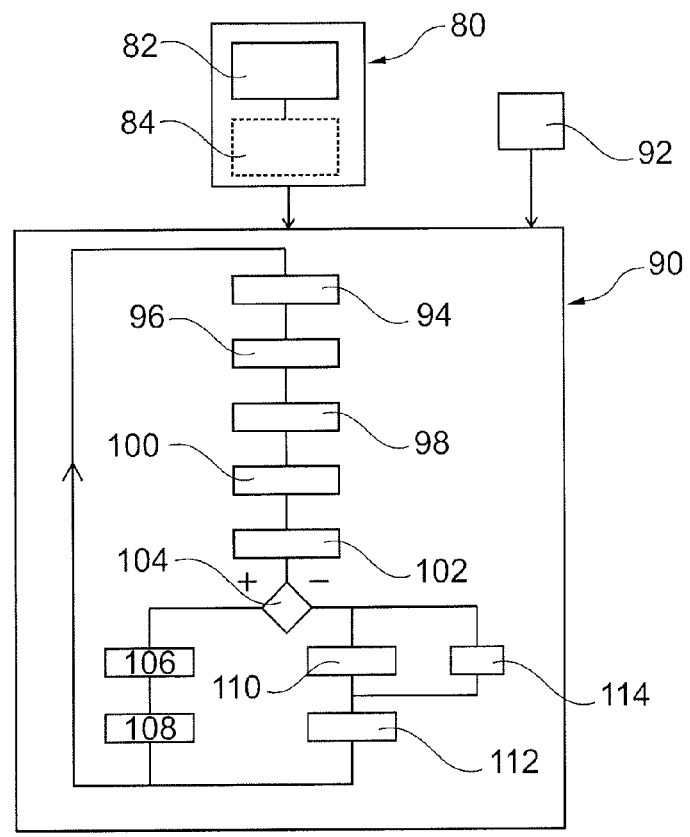
FIG. 3 is a flowchart of a method for manufacturing the construction elements and assisting the placement of these construction elements.

The manufacture of the element 6 and the operation of the system 2 will now be described with the aid of the method of FIG. 3.

Initially, during a phase 80, the manufacture of the construction elements 6 is undertaken.

More precisely, during a step 82, each element 6 is manufactured and the instrumented module 12 is incorporated inside the element 6.

For example, the instrumented module 12 is incorporated in the raw material used to make the element 6. Thereafter, this raw material incorporating the module 12 is fashioned, for example by moulding or the like, to obtain the definitive shape of the construction element. In this case, the orientation of the instrumented module 12 with respect to the frame of reference R is unknown on completion of step 82.

In another example of manufacture, the element 6 is firstly fashioned and a housing is hollowed out in the element 6 to receive the instrumented module 12. Thereafter, the instrumented module 12 is fixed in this housing. For example, the instrumented module 12 is deposited in the bottom of this housing and then this housing is resealed. Preferably, when the instrumented module 12 is disposed in the housing, the latter is disposed inside this housing according to a predetermined orientation so that the orientation of the module 12 in the frame of reference R is known.

After step 82, if the orientation of the instrumented module 12 in the frame of reference R is unknown, then a calibration step 84 is undertaken. During this step 84, the construction element 6 is placed in a predetermined orientation and then the sensor 50 measures the orientation of the element 6. This measured orientation is called the calibration orientation.

Thereafter, the calculator 58 corrects the measured orientations emitted by the emitter 62 as a function of the calibration orientation so that the emitted measurements correspond, whatever the construction element, to an orientation measured in the same frame of reference $R_O$.

The manufacturing phase is then complete.

The supplying of the construction elements to the worksite is then undertaken. For example, the construction elements are delivered to the worksite where the work is to be constructed. A phase 90 of constructing the work 4 then starts.

Beforehand, during a step 92, the table 36 is constructed on the basis of a plan of the work by taking account of the thickness of the binder 8 placed between each of the construction elements.

During the placement of each of the construction elements, the user is assisted by the system 2.

The operation of the system 2 is now described in the particular case of the placement of the i-th construction element 6 in the work 4.

During a step 94, the i-th construction element supplied is moved by the user to bring it towards the work 4. The calculator 58 detects this movement. For example, the calculator 58 detects the movement of the element 6 on the basis of the measurements of the accelerometer 52. In response, it exits a standby mode and enters an active mode.

During a step 96, in the active mode, the sensor 50 measures the orientation of the element 6 in the frame of reference $R_O$ and transmits the measured orientation to the emitter 62 which transmits it to the device 10.

During a step 98, the sensor 20 measures the position of the element 6 on the basis of the electromagnetic waves emitted by the emitter 62.

During a step 100, the calculator 38 selects from the table 36 the setpoints $C_{oi}$ and $C_{pi}$ associated with the serial number i.

During a step 102, the calculator 38 calculates the discrepancy between the measured orientation and the orientation setpoint $C_{oi}$. The calculator 38 also calculates the discrepancy between the position measured by the sensor 20 and the position setpoint $C_{pi}$.

During a step 104, the calculator 38 determines whether the calculated discrepancies are significant. For example, during step 104, the calculator 38 compares the calculated discrepancies with predetermined thresholds. The discrepancy is significant if a predetermined threshold is crossed.

If there exists at least one significant discrepancy, then the calculator undertakes a step 106 during which it instructs the man-machine interface 40 to indicate this discrepancy to the user.

In response, during a step 108, the user adjusts the placement of the construction element 6 as a function of the indicated discrepancies so as to try to reduce them. The method then returns to step 94 to continue adjusting the placement of the i-th construction element.

If during step 104, the calculator 38 establishes that the discrepancies are not significant, this signifies that the element 6 is now correctly oriented and positioned. In this case, during a step 110, the calculator 38 indicates, to the user, that the element 6 is correctly placed by way of the man-machine interface 40. In response, the user no longer moves this element 6.

In parallel with step 110, during a step 114, the calculator 38 identifies the next construction element to be placed. In this embodiment, this consists simply in incrementing the serial number i so as to go to the next construction element to be placed.

During a step 112, the calculator 58 of the element 6 detects the absence of movement for a predetermined duration. If the element 6 has not been moved for this predetermined duration, it passes automatically from the active mode to the standby mode. In standby mode, the emitter 62 is deactivated so that the element 6 no longer emits any electromagnetic wave. Moreover, here, in the standby mode, the magnetometer 54 and the gyrometer 56 are also deactivated to save the energy stored in the battery 64.

Thereafter, the method returns to step 94 to place the (i+1)-th construction element.

Numerous other embodiments are possible. For example, the construction element may be a quarry-stone, a beam, a pipe, a pipeline pipe, a glass pane, a polymer plate, a concrete block or the like.

The construction element may be made from a single or several materials such as cement, concrete, reinforced concrete, metal, wood, conglomerate, glue or binders.

The construction element can also exhibit holes or projections intended to fit with a complementary shape of another construction element.

The instrumented module 12 is not necessarily buried inside the construction element. For example, it is fixed, with the aid of glue or screws, on an exterior face of the construction element.

The frame of references in which the accelerometer, the magnetometer and the gyrometer obtain their respective measurements do not necessarily coincide. However, they must be fixed with respect to one another and the position of these frame of references with respect to one another must be known.

Other embodiments of the orientation sensor are possible. For example, the orientation sensor may be embodied on the basis of three coder wheels each determining the angle between a respective axis of the frame of reference R and a mobile arm which aligns automatically parallel to the gravity field.

The gyrometer 56 may be omitted if the movements when adjusting the placement of the construction element are slow enough to be in static or quasi-static situation. Another solution for dispensing with the gyrometer 56 consists in waiting for the end of the movement before carrying out a new measurement.

The position sensor may be integrated into the construction element. In this case, the sensor 20 of the signalling device 10 is omitted. The position measured by this integrated sensor is then transmitted, for example, by way of the emitter 62 to the device 10. The position sensor that could be integrated inside the construction element is for example a GPS ("Global Positioning System") sensor.

In another embodiment, the position sensor is omitted. Thus, in this variant, the system only assists the user in respect of the operations for orienting the construction element.

The instrumented module 12 can also comprise other sensors such as temperature or pressure sensors so as to afford additional information about the state of the construction element.

The instrumented module 12 may be powered by means other than a battery. For example, energy may be transferred to the instrumented module 12 by way of a wireless link in the form of electromagnetic waves. The instrumented module 12 can also be energized by a system which converts the mechanical energy of the movement into electrical energy.

As a variant, the signalling device 10 is replaced with a signalling device integrated into each construction element. This integrated device advantageously fulfils the same functions as the device 10. However, in this case, the man-machine interface is simplified. For example, the screen is replaced with a simple suite of light-emitting diodes. For example, the bigger the discrepancy between the measured orientation or position and the orientation or position setpoint, the faster the light-emitting diodes flash. The man-machine interface can also be embodied with the aid of sensory elements such as vibrations.

In another embodiment, the instrumented module transmits the measurements of the accelerometer 52, magnetometer 54 and gyrometer 56 to the device 10. The determination of the orientation in the frame of reference $R_0$ is then carried out by the signalling device on the basis of the measurements transmitted.

The instrumented module 12 can also comprise a receiver. This then makes it possible to transfer the orientation setpoint $C_{oi}$ and the position setpoint $C_{pi}$ to the module 12 so as to record them. The discrepancies between these setpoints $C_{oi}$ and $C_{pi}$ and the orientation and position measurements are then calculated by the calculator 58, actually inside the instrumented module 12.

The signalling device 10 can comprise a receiver independent of the sensor 20.

As a variant, passing from the identifier i to the next identifier i+1 is carried out differently than by detecting an absence of movement of the construction element. For example, the incrementation of the identifier i is triggered manually by the user by pressing a button.

The identifier i of the table 36 may be something other than a serial number. For example, stored in the memory 60 of each of the instrumented modules 12 is an identifier making it possible to identify it uniquely from among all the construction elements 6. The identifier i is then transmitted at the same time as the orientation measurements. The signalling device is adapted for retrieving the setpoints $C_{oi}$ and $C_{pi}$ from the table 36 by virtue of the identifier i received. The setpoints found are used for comparing the setpoints with the orientation and with the position measured.

In another example, the identifier recorded in the memory 60 of each element 6 is the same for all the structurally identical construction elements 6. For example, all bricks of the same dimensions have the same identifier. Stated otherwise, construction elements which are mutually interchangeable bear the same construction identifier.

The orientation or position setpoint for a given element may be predetermined as a function of the orientation and/or position measured for another construction element already placed in the same work.

Step 108 consisting in adjusting the placement of the construction element may be carried out by a human being or by a manipulator robot equipped with means for gripping the construction element and capable of adjusting the orientation and/or position thereof. Typically, the robot is actuated by motors. In the case of a robot, the signalling device dispatches the determined discrepancies to this robot which then adjusts the placement of the construction element as a function of the discrepancies received. In the latter embodiment, preferably, the signalling device is integrated into the robot.

What has been described above applies to any type of civil engineering work for example a wall or any other construction requiring the joining together of construction elements such as for example a pipeline, a bridge or the like.

The invention claimed is:

1. A method of assisting the placement of construction elements of a civil engineering work by a user, said method comprising: for each construction element, supplying said construction element with at least one orientation sensor, said orientation sensor being fixed, without any degree of freedom, to said construction element, using the at least one orientation sensor to measure an orientation of said construction element with respect to three non-coplanar axes, determining a discrepancy between the orientation measured by said orientation sensor and an orientation setpoint, indicating the discrepancy to the user, and the user adjusting the orientation of said construction element as a function of the discrepancy between the orientation measured by said at least one orientation sensor and the orientation setpoint, wherein supplying said construction element with at least one orientation sensor comprises supplying said construction element with: a three-axis accelerometer configured to measure intensity of the gravitational field along three non-coplanar measurement axes, and a three-axis magnetometer configured for measuring intensity of the terrestrial magnetic field along at least three non-coplanar measurement axes.

2. The method of claim 1, further comprising: storing in a table an orientation setpoint for each of the construction elements, identifying a construction element to be placed by the user, and determining from the table the orientation setpoint of the construction element to be placed.

3. The method of claim 1, wherein adjusting the orientation comprises adjusting the orientation automatically by a robot for handling the construction element as a function of said discrepancy between measured orientation and selected setpoint.

4. A system for assisting placement of construction elements of a civil engineering work, said system comprising: construction elements to be positioned with respect to one another so as to construct the civil engineering work, each construction element being equipped with at least one orientation sensor, said sensor being fixed without any degree of freedom to the construction element and configured to measure an orientation of the construction element with respect to three non-coplanar axes; and an electronic signaling device configured to indicate a discrepancy between orientation measured by the orientation sensor of any one of the construction elements and an orientation setpoint for the construction element wherein the orientation sensor comprises: a three-axis accelerometer configured to measure intensity of the gravitational field along three non-coplanar measurement axes, and a three-axis magnetometer configured for measuring intensity of the terrestrial magnetic field along at least three non-coplanar measurement axes.

5. The system of claim 4, wherein the signaling device is mechanically independent of the construction elements, and wherein the signaling device comprises: a man-machine interface, and at least one electronic calculator programmed to control the man-machine interface so as to indicate, in a way that is comprehensible to a human being, the discrepancy between the orientation measured by the orientation sensor fixed to the construction element and the orientation setpoint for the construction element.

6. The system of claim 4, further comprising a position sensor configured to measure coordinates of the construction element along three non-coplanar axes in a frame of reference tied to the earth, and wherein the signaling device is configured to also indicate a discrepancy between the position measured by the position sensor for any one of the construction elements and a position setpoint for the construction element.

7. A manufacture comprising a construction element having at least one orientation sensor, fixed without any degree of freedom thereto, said orientation sensor being configured to measure orientation of the construction element with respect to three non-coplanar axes;

wherein the orientation sensor comprises: a three-axis accelerometer configured to measure intensity of the gravitational field along three non-coplanar measurement axes, and a three-axis magnetometer configured for measuring intensity of the terrestrial magnetic field along at least three non-coplanar measurement axes.

8. The manufacture of claim 7, wherein the orientation sensor comprises a gyrometer fixed without any degree of freedom to the construction element, the gyrometer being configured for measuring angular rotation speed of the construction element about three non-coplanar measurement axes.

9. The manufacture of claim 7, further comprising a position sensor configured to measure coordinates of the construction element along three non-coplanar axes in a frame of reference tied to the earth.

10. The manufacture of claim 7, wherein the orientation sensor is buried inside the construction element in such a way that no constituent element of the sensor is flush with or projects from an external face of the construction element.

11. The manufacture of claim 7, wherein the construction element comprises a material chosen from the group consisting of a brick, a quarry-stone.

12. The manufacture of claim 7, wherein the construction element comprises a shape chosen from the group consisting a tube, a beam and a plate.

* * * * *